(12) United States Patent
Oguri et al.

(10) Patent No.: US 7,593,739 B2
(45) Date of Patent: Sep. 22, 2009

(54) LOCATION ESTIMATING APPARATUS AND LOCATION ESTIMATING METHOD

(75) Inventors: Shin Oguri, Tokyo (JP); Masatoshi Kimoto, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 481 days.

(21) Appl. No.: 11/411,881

(22) Filed: Apr. 27, 2006

(65) Prior Publication Data
US 2006/0247890 A1 Nov. 2, 2006

(30) Foreign Application Priority Data
Apr. 28, 2005 (JP) ............................ P2005-132723

(51) Int. Cl.
*H04W 24/00* (2006.01)

(52) U.S. Cl. .............. 455/456.1; 455/456.2; 455/456.5; 455/456.6

(58) Field of Classification Search .............. 455/456.1, 455/456.2, 456.6, 456.5
See application file for complete search history.

(56) References Cited

U.S. PATENT DOCUMENTS

| | | | | |
|---|---|---|---|---|
| 5,563,608 | A * | 10/1996 | Tachita et al. | 342/357.14 |
| 6,879,836 | B2 * | 4/2005 | Nakamoto et al. | 455/456.2 |
| 6,892,131 | B2 * | 5/2005 | Coffee et al. | 455/518 |
| 7,176,813 | B2 * | 2/2007 | Kawamata et al. | 340/995.13 |
| 2001/0020216 | A1 * | 9/2001 | Lin | 701/216 |
| 2003/0022676 | A1 * | 1/2003 | Nakamoto et al. | 455/456 |
| 2004/0039504 | A1 * | 2/2004 | Coffee et al. | 701/35 |
| 2006/0055565 | A1 * | 3/2006 | Kawamata et al. | 340/995.13 |

FOREIGN PATENT DOCUMENTS

| | | |
|---|---|---|
| JP | 8-68651 | 3/1996 |
| JP | 2002-341011 | 11/2002 |
| JP | 2003-90872 | 3/2003 |

* cited by examiner

*Primary Examiner*—Joseph H Feild
*Assistant Examiner*—Huy D Nguyen
(74) *Attorney, Agent, or Firm*—Oblon, Spivak, McClelland, Maier & Neustadt, L.L.P.

(57) ABSTRACT

A location estimating apparatus 10 has an information acquiring part 12, an information storing part 18, and an arithmetic processing part 20. The information acquiring part 12 has a location information acquirer 14 for acquiring location information of a mobile object from information, and an error information acquirer 16 for acquiring error information from information. The information storing part 18 stores the location information and error information sent from the information acquiring part 12, at each measurement time. The arithmetic processing part 20 estimates a location from the location information and error information from the information acquiring part 12. The arithmetic processing part 20 of the location estimating apparatus estimates the location of the mobile object by successively executing a first step of estimating a moving area per unit time of the mobile object, a second step of estimating an existing area at present of the mobile object, and a third step of estimating a location at present of the mobile object. This makes it feasible to provide location estimating means capable of achieving a high matching rate with an actual state, without use of other device information, while effectively utilizing information.

12 Claims, 17 Drawing Sheets

Fig.2

| TIME | LOCATION INFORMATION | ERROR INFORMATION |
|---|---|---|
| T(-2) | LATITUDE 35.56 NORTH LONGITUDE 135.60 EAST | 50m |
| T(-1) | LATITUDE 35.58 NORTH LONGITUDE 135.62 EAST | 25m |
| T(0) | LATITUDE 35.60 NORTH LONGITUDE 135.64 EAST | 50m |
| T(1) | LATITUDE 35.60 NORTH LONGITUDE 135.66 EAST | 100m |
| T(2) | LATITUDE 35.60 NORTH LONGITUDE 135.68 EAST | 50m |
| — | — | — |
| — | — | — |
| — | — | — |

$r_2=R_0+2R_1$ $r_2 > R_2$

LOCATION ESTIMATING APPARATUS AND LOCATION ESTIMATING METHOD

BACKGROUND OF THE INVENTION

1. Field of the Invention

The present invention relates to a location estimating apparatus and a location estimating method.

2. Related Background Art

In recent years, in order to specify an existing location of a mobile object such as a vehicle or a user carrying a cell phone, it is common practice to specify the present location of the mobile object by use of positioning information transmitted from the GPS (Global Positioning System) satellites and others. The positioning information in this case is location information at discontinuous time points and the location information contains a certain range of error. For this reason, there are proposals on attempts to increase the matching rate with an actual state. For example, a method proposed is to estimate the location of the mobile object while discarding information with low accuracy out of the positioning information measured (cf. Japanese Patent Applications Laid-Open No. 2002-341010 and Laid-Open No. 2002-341011). Another method proposed is to increase the matching rate with the actual state by use of other device information like acceleration sensor information (cf. Japanese Patent Application Laid-Open No. 2003-90872).

SUMMARY OF THE INVENTION

However, the method of discarding the information with low accuracy as described above is poor in efficiency in terms of effective utilization of information, and the method of using the other device information like the acceleration sensor information has the problem of increase of device cost.

The present invention has been accomplished in view of the above circumstances and an object of the invention is to provide location estimating means capable of achieving a high matching rate with an actual state, without use of other device information, while effectively utilizing information.

The present invention is a location estimating apparatus comprising: information acquiring means for acquiring location information pieces and error information pieces of a mobile object measured at present and at a plurality of time points in the past; and arithmetic processing means for arithmetically processing the location information pieces and the error information pieces acquired by the information acquiring means, wherein the arithmetic processing means executes: a first step of estimating a moving area per unit time of the mobile object from the location information pieces and the error information pieces of the mobile object measured at a plurality of time points in the past, acquired by the information acquiring means; a second step of estimating an existing area at present of the mobile object from the moving area per unit time of the mobile object and from the location information piece and the error information piece of the mobile object measured at a time point in the past, acquired by the information acquiring means; and a third step of estimating a location at present of the mobile object from the existing area at present of the mobile object and from the location information piece and the error information piece of the mobile object measured at the present time, acquired by the information acquiring means.

In this configuration, the arithmetic processing means estimates the moving area per unit time of the mobile object from the location information pieces and the error information pieces measured at the plurality of time points in the past, acquired by the information acquiring means, and estimates the existing area at present of the mobile object from the moving area and from the location information piece and the error information piece of the mobile object measured at the time point in the past. Then the arithmetic processing means estimates the location at present of the mobile object from the present existing area of the mobile object estimated and from the presently measured location information and error information. Therefore, the location estimating apparatus is able to perform the location estimation at a high matching rate with an actual state, without use of other device information, while effectively utilizing information.

In this case, preferably, the arithmetic processing means performs the first step of estimating the moving area from the location information pieces and the error information pieces of the mobile object measured at a plurality of time points in the past, acquired by the information acquiring means, before an area of the moving area estimated becomes not more than a certain value.

In this configuration, the arithmetic processing means performs the step of estimating the moving area from the location information pieces and the error information pieces measured at the plurality of time points in the past before the area of the estimated moving area becomes not more than the certain value; therefore, the area of the moving area of the mobile object estimated becomes not more than the certain value and the apparatus is thus able to perform the location estimation with higher accuracy.

Preferably, the arithmetic processing means performs the first step of giving a point value based on the error information to the moving area estimated and estimating the moving area from the location information pieces and the error information pieces of the mobile object measured at a plurality of time points in the past, acquired by the information acquiring means, before the point value becomes not less than a certain value.

In this configuration, the arithmetic processing means performs the step of giving the point value based on the error information to the estimated moving area and estimating the moving area from the location information pieces and the error information pieces measured at the plurality of time points in the past before the point value becomes not less than the certain value; therefore, the accuracy of the moving area of the mobile object estimated becomes not less than a certain level and the apparatus is thus able to perform the location estimation with higher accuracy.

Preferably, the arithmetic processing means performs the second step of estimating the existing area at present of the mobile object from the moving area per unit time of the mobile object and from the location information pieces and the error information pieces of the mobile object measured at a plurality of time points in the past, acquired by the information acquiring means.

In this configuration, the arithmetic processing means estimates the existing area at present of the mobile object from the moving area and from the location information pieces and the error information pieces measured at the plurality of time points in the past, acquired by the information acquiring means; therefore, even in a case where an error of the error information measured at a time point in the past is so large as to degrade accuracy, the range of the existing area can be narrowed by estimating the existing area on the basis of the location information pieces and the error information pieces measured at the plurality of time points, and the apparatus is thus able to perform the location estimation with higher accuracy.

Another aspect of the present invention provides a location estimating method comprising: a first step of estimating a moving area per unit time of a mobile object from location information pieces and error information pieces of the mobile object measured at a plurality of time points in the past; a second step of estimating an existing area at present of the mobile object from the moving area per unit time of the mobile object and from the location information piece and the error information piece of the mobile object measured at a time point in the past; and a third step of estimating a location at present of the mobile object from the existing area at present of the mobile object and from the location information piece and the error information piece of the mobile object measured at the present time.

In this case, preferably, the first step comprises estimating the moving area from the location information pieces and the error information pieces of the mobile object measured at the plurality of time points in the past, before an area of the moving area estimated becomes not more than a certain value.

Preferably, the first step comprises giving a point value based on the error information to the moving area estimated and estimating the moving area from the location information pieces and the error information pieces of the mobile object measured at the plurality of time points in the past, before the point value becomes not less than a certain value.

Preferably, the second step comprises estimating the existing area at present of the mobile object from the moving area per unit time of the mobile object and from the location information pieces and the error information pieces of the mobile object measured at a plurality of time points in the past.

The location estimating apparatus and the location estimating method according to the present invention are able to perform the location estimation at a high matching rate with an actual state, without use of other device information, while effectively utilizing information.

BRIEF DESCRIPTION OF THE DRAWINGS

FIG. 2 is a diagram showing an example of location information and error information stored in an information storing part according to the first embodiment of the present invention.

DESCRIPTION OF THE PREFERRED EMBODIMENTS

The location estimating apparatus according to embodiments of the present invention will be described below with reference to the accompanying drawings. Constituent elements with the same reference symbols will denote the same constituent elements, and redundant description will be omitted.

Figure 1:
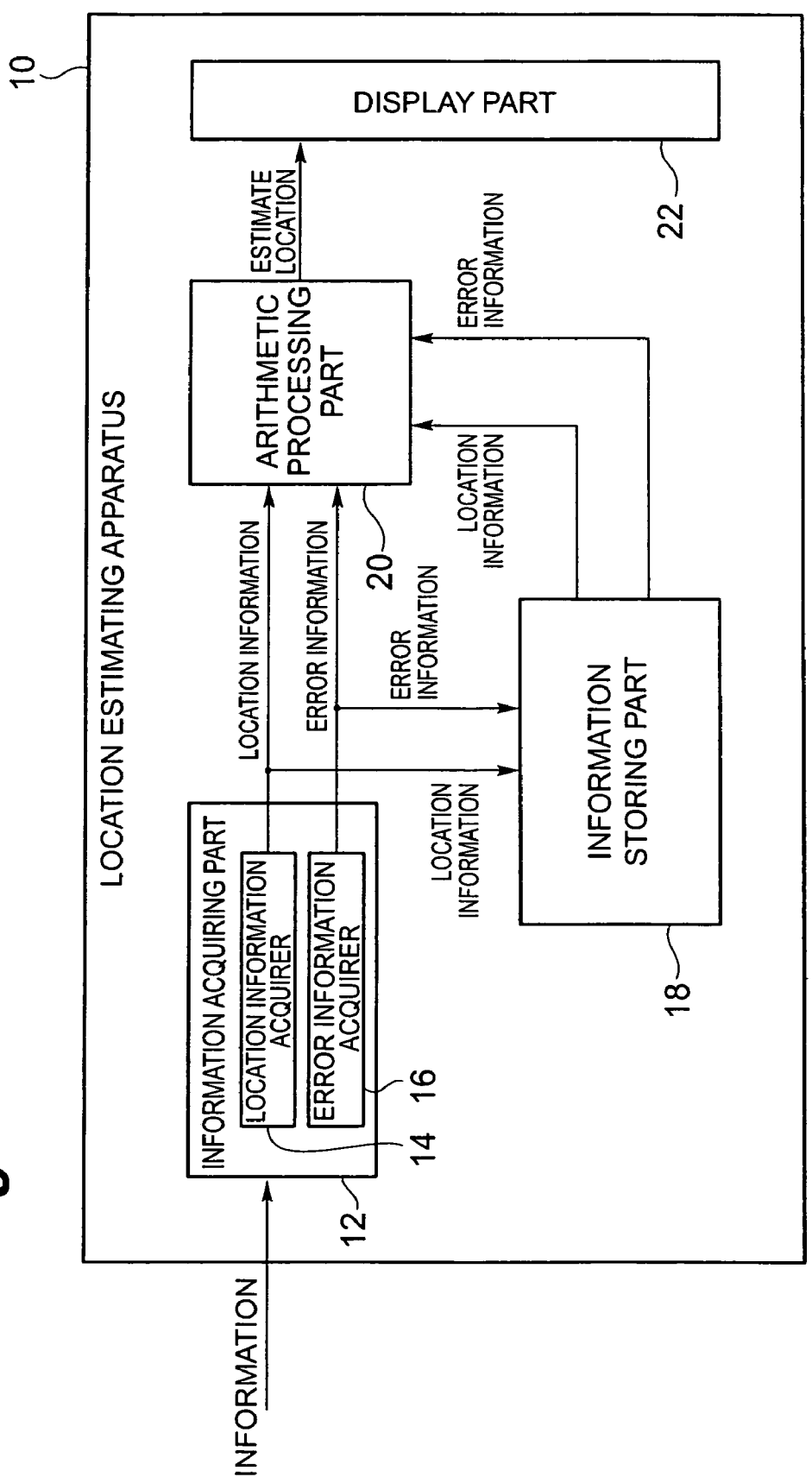
FIG. 1 is a diagram showing a configuration of a location estimating apparatus according to the first embodiment of the present invention.

First described is a configuration of the location estimating apparatus according to the first embodiment of the present invention. FIG. 1 is a diagram showing the configuration of the location estimating apparatus according to the first embodiment of the present invention. As shown in FIG. 1, the location estimating apparatus 10 of the present embodiment has information acquiring part 12 (information acquiring means), information storing part 18, arithmetic processing part 20 (arithmetic processing means), and display part 22, and is constructed as an apparatus for receiving GPS signals from the GPS satellites, and information such as cell information (base station information) or tag information and for estimating a location of an automobile or a user carrying a cell phone.

The information acquiring part 12 is physically composed of an antenna receiver, an RF circuit, a signal converter, and so on, and is configured to receive information such as the GPS signals. The information acquiring part 12 has location information acquirer 14 for acquiring location information of the mobile object from the information, and error information acquirer 16 for acquiring error information of the location information of the mobile object from the information. The location information and error information from the information acquiring part 12 is fed directly to the arithmetic processing part 20, and is also fed to the information storing part 18 to be stored once therein and then fed to the arithmetic processing part 20.

The information storing part 18 is physically composed of a ROM (Read Only Memory), a RAM (Random Access Memory), and so on, and is configured to store the location information and error information fed from the information acquiring part 12, at each measurement time. FIG. 2 is a diagram showing an example of the location information and error information stored in the information storing part according to the first embodiment of the present invention. As shown in FIG. 2, the information storing part 18 stores the location information consisting of latitude and longitude, and the error information indicating an error range thereof, for each time.

Referring back to FIG. 1, the arithmetic processing part 20 is physically composed of a CPU (Central Processing Unit), a ROM, a RAM, and so on, and is configured to estimate the present location from the location information and error information acquired from the information acquiring part 12, by a technique which will be described later. An estimate location estimated by the processing part 20 is fed to the display part 22 consisting of a liquid crystal display or the like, to be displayed for the user.

Figure 3:
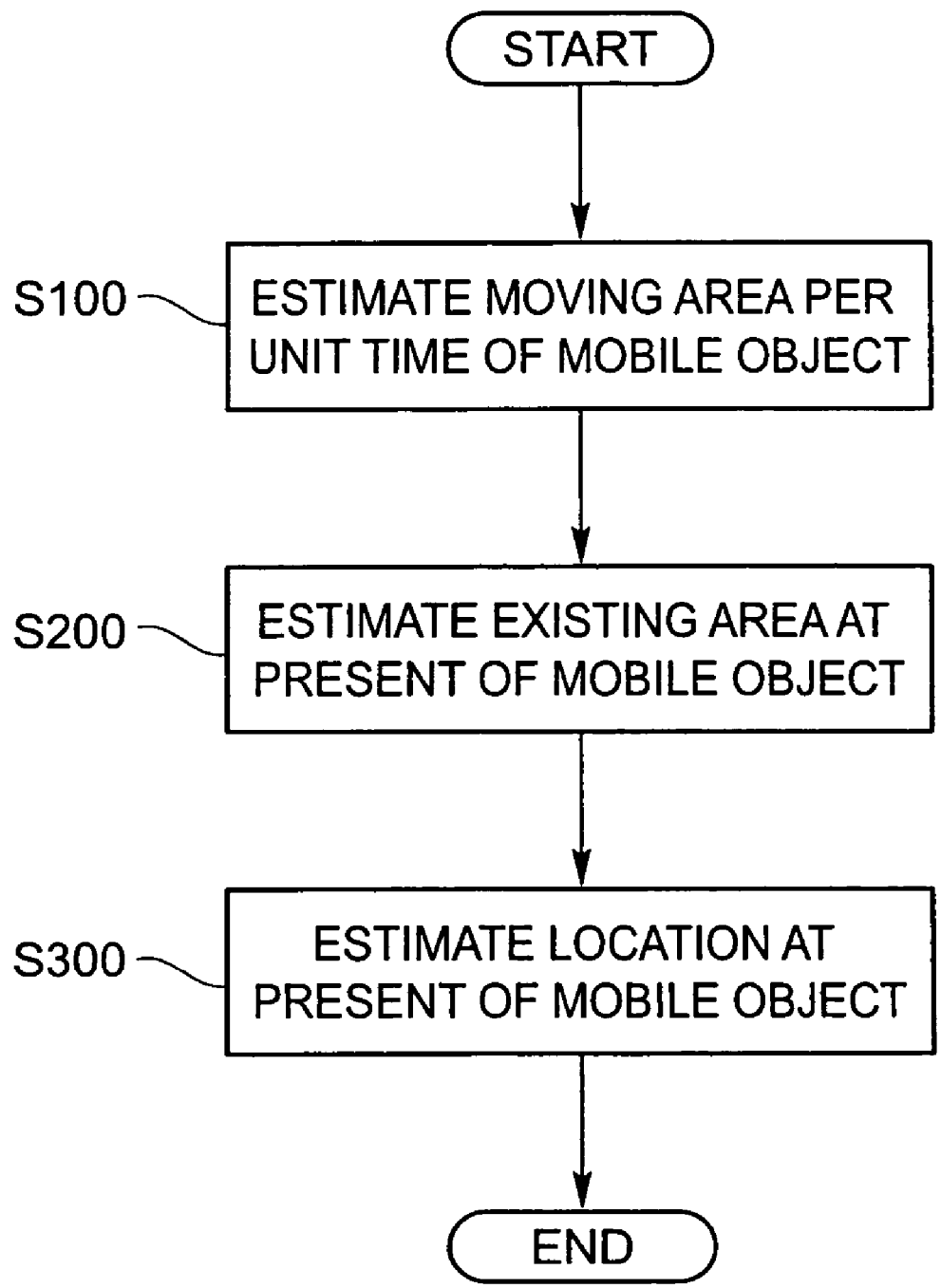
FIG. 3 is a flowchart showing an operation of the location estimating apparatus according to the first embodiment of the present invention.

An operation of the location estimating apparatus of the present embodiment will be described below, along with a location estimating method of the present embodiment. FIG. 3 is a flowchart showing the operation of the location estimating apparatus according to the first embodiment of the present invention. The location estimating method of the present embodiment is roughly composed of three steps, and the arithmetic processing part of the location estimating apparatus estimates the location of the mobile object by sequentially executing a first step (S100) of estimating a moving area per unit time of the mobile object, a second step (S200) of estimating an existing area at present of the mobile object, and a third step (S300) of estimating the location at present of the mobile object.

Figure 4:
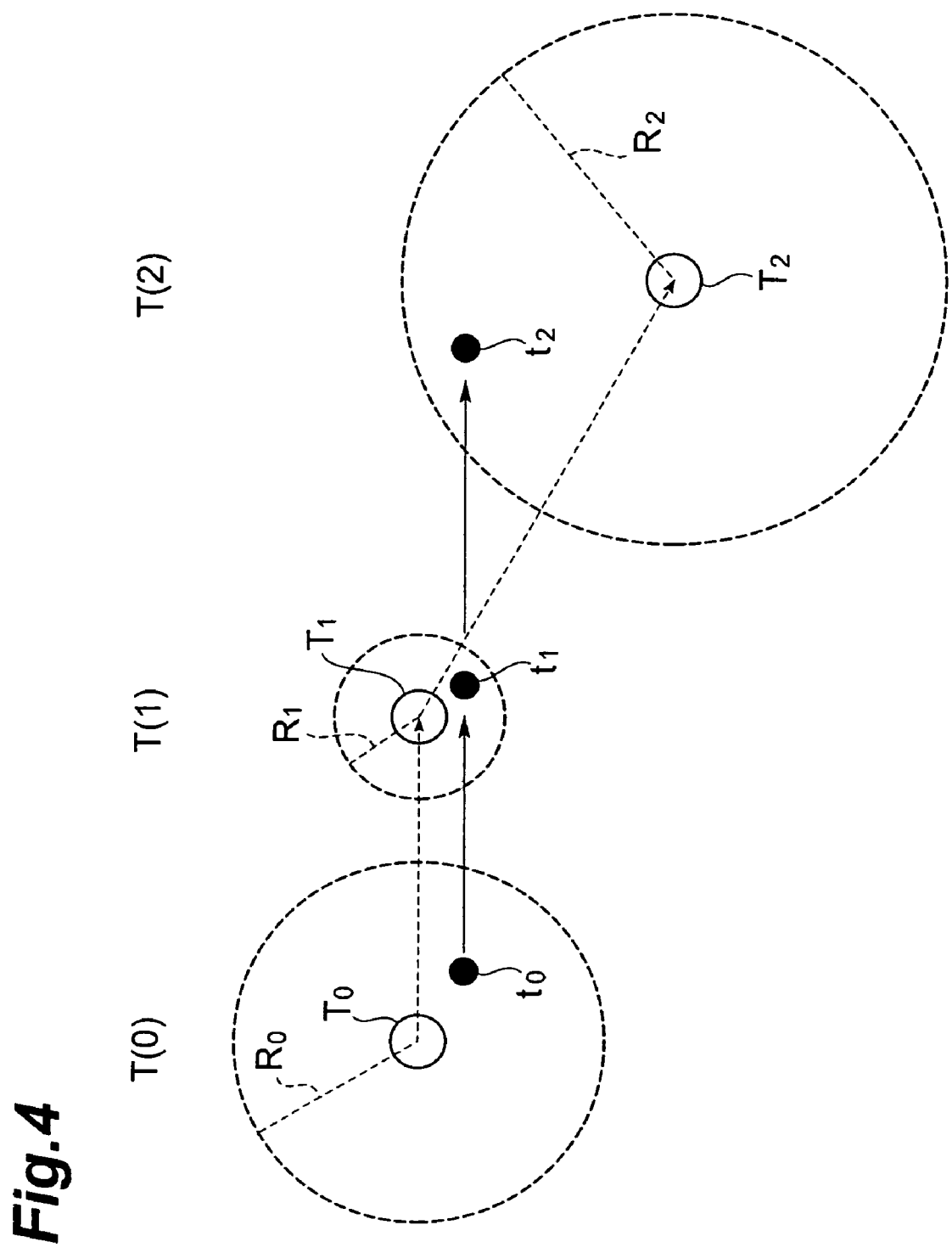
FIG. 4 is an illustration showing a model case according to the first embodiment of the present invention.

FIG. 4 is an illustration showing a model case according to the first embodiment of the present invention. This case indicates a situation in which each of a time duration between times T(0) and T(1) and a time duration between T(1) and T(2) is assumed to be a unit time. FIG. 4 shows measured locations $T_0$, $T_1$, and $T_2$ with respective measurement errors $R_0$, $R_1$, and $R_2$ at past times T(0) and T(1) and at the present time T(2), and shows a state in which the measured locations at the times T(0) and T(1) match actual locations $t_0$, $t_1$ well because of the small measurement errors $R_0$ and $R_1$ and in which the measured location at the present time T(2) fails to match the actual location $t_2$ because of the large measurement error $R_2$.

Figure 5:
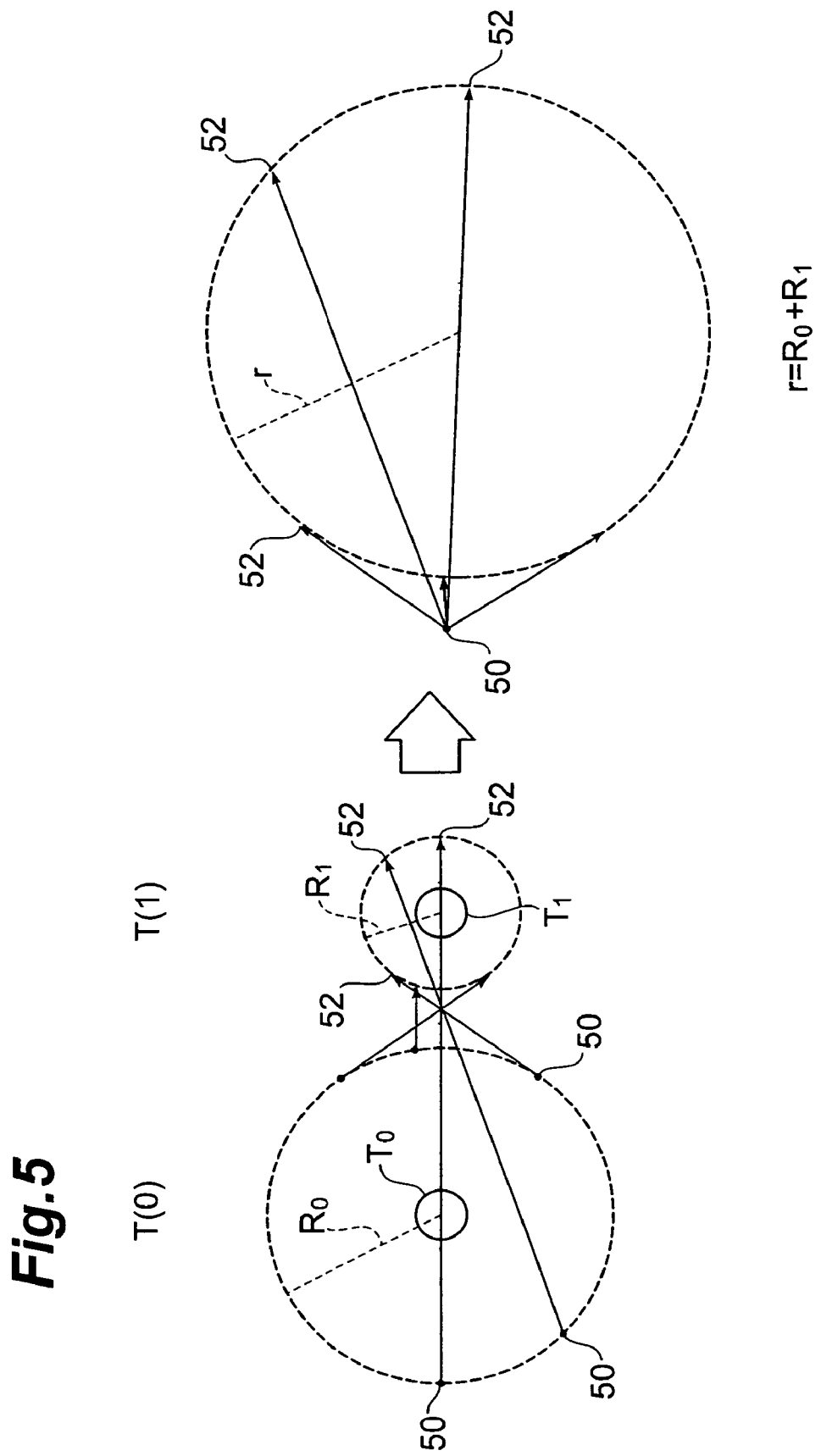
FIG. 5 is an illustration showing a method of estimating a moving area according to the first embodiment of the present invention.

In the location estimating method of the present embodiment the first step is to estimate a moving area per unit time of the mobile object. FIG. 5 is an illustration showing a method of estimating the moving area according to the first embodiment of the present invention. As shown in FIG. 5, first, the measurement errors $R_0$, $R_1$ at the respective measured locations $T_0$, $T_1$ are used to draw arrows from start points 50 on the range of measurement error $R_0$ to end points 52 on the range of measurement error $R_1$. Then the start points 50 of the respective arrows are put together, whereby an aggregate of the end points 52 of the respective arrows allows us to estimate a moving area r with the radius $r=R_0+R_1$.

Figure 6:
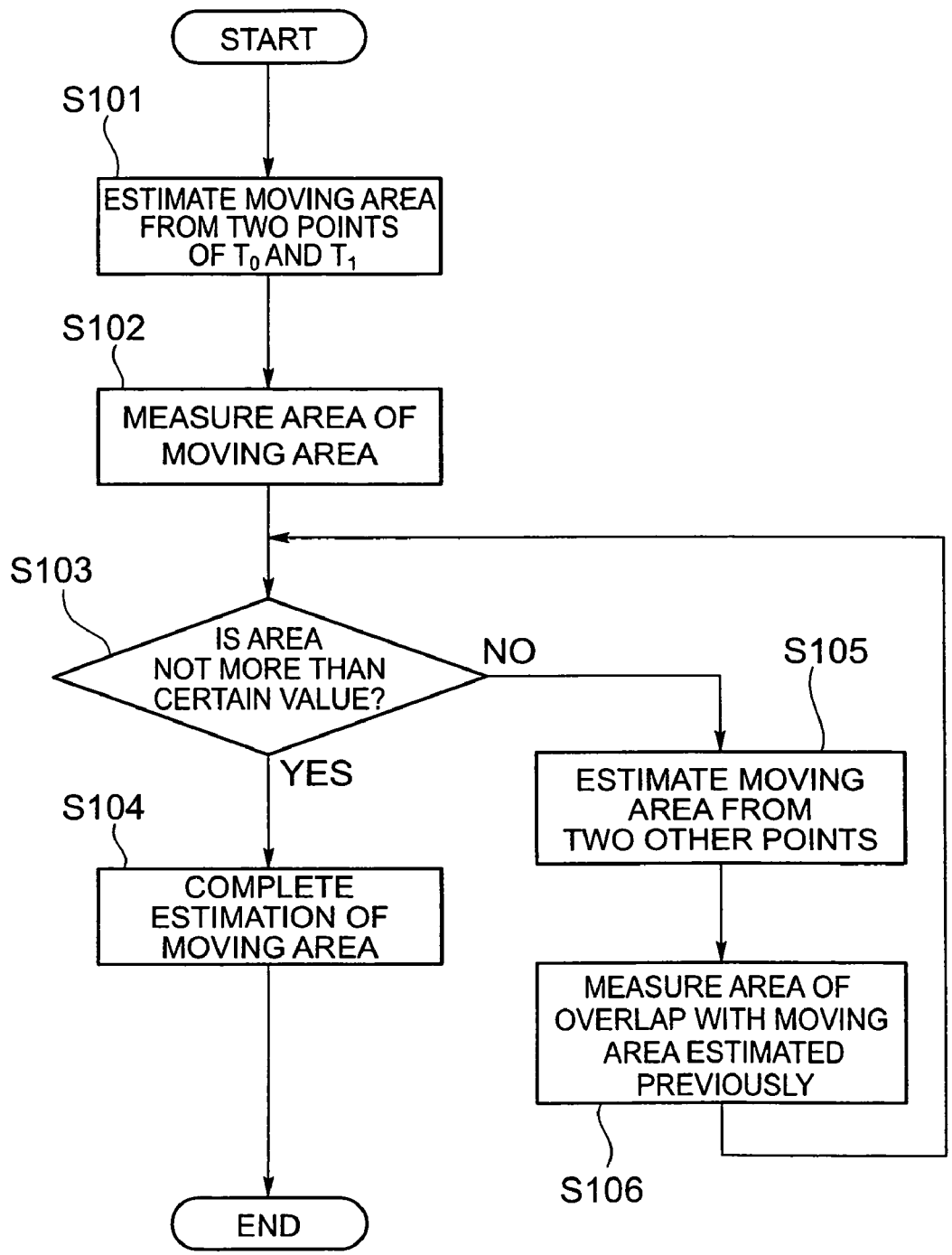
FIG. 6 is a flowchart showing estimation of a moving area according to the first embodiment of the present invention.

FIG. 6 is a flowchart showing the estimation of the moving area according to the first embodiment of the present invention. The moving area estimated is affected by error information pieces of two location information pieces in the past to be used, and is thus narrowed down before the moving area reaches a certain accuracy. In the present embodiment the estimation of the moving area is carried out from the location information and error information measured at a plurality of time points in the past before the area of the moving area estimated becomes not more than a certain value.

First, the moving area is estimated from two points of measured locations $T_0$, $T_1$ (S101). Next, the area of the moving area is measured (S102). If the area of the moving area is not more than the certain value, the estimation of the moving area is completed (S103, S104). If the area of the moving area is more than the certain value, the moving area is estimated from two points at other times, e.g., from measured locations $T_{-2}$, $T_{-1}$ at times T(−2) and T(−1) (S103, S105). Then an area of an overlap is measured between the previously estimated moving area and the presently estimated moving area (S106). When the area is not more than the certain value, the overlap is defined as the moving area and the estimation of the moving area is completed (S103, S104). If the area is more than the certain value, the arithmetic processing part 20 is arranged to repeat the steps of further estimating the moving area from two other points and checking whether the area of the overlap with each moving area estimated previously is not more than the certain value (S105, S106). This method enables the arithmetic processing part to estimate the moving area with higher accuracy.

Figure 7:
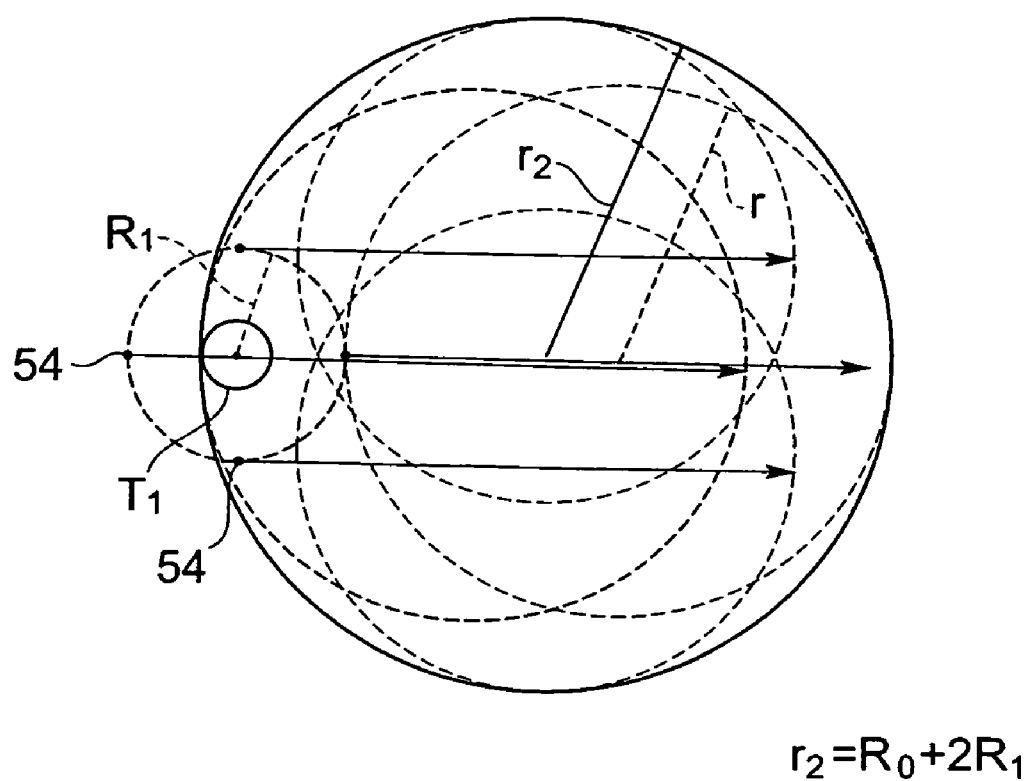
FIG. 7 is an illustration showing a method of estimating an existing area according to the first embodiment of the present invention.

Next, an existing area at present of the mobile object is estimated. FIG. 7 is an illustration showing a method of estimating the existing area according to the first embodiment of the present invention. As shown in FIG. 7, the measurement error $R_1$ at the measured location $T_1$ is used to form an aggregate of moving areas r estimated at the previous step, as indicated by dashed lines, with the range of $R_1$ as start points 54. Then the existing area $r_2$ with the radius $r_2=P_0+2R_1$ can be estimated from the aggregate of moving areas indicated by the dashed lines.

Figure 8:
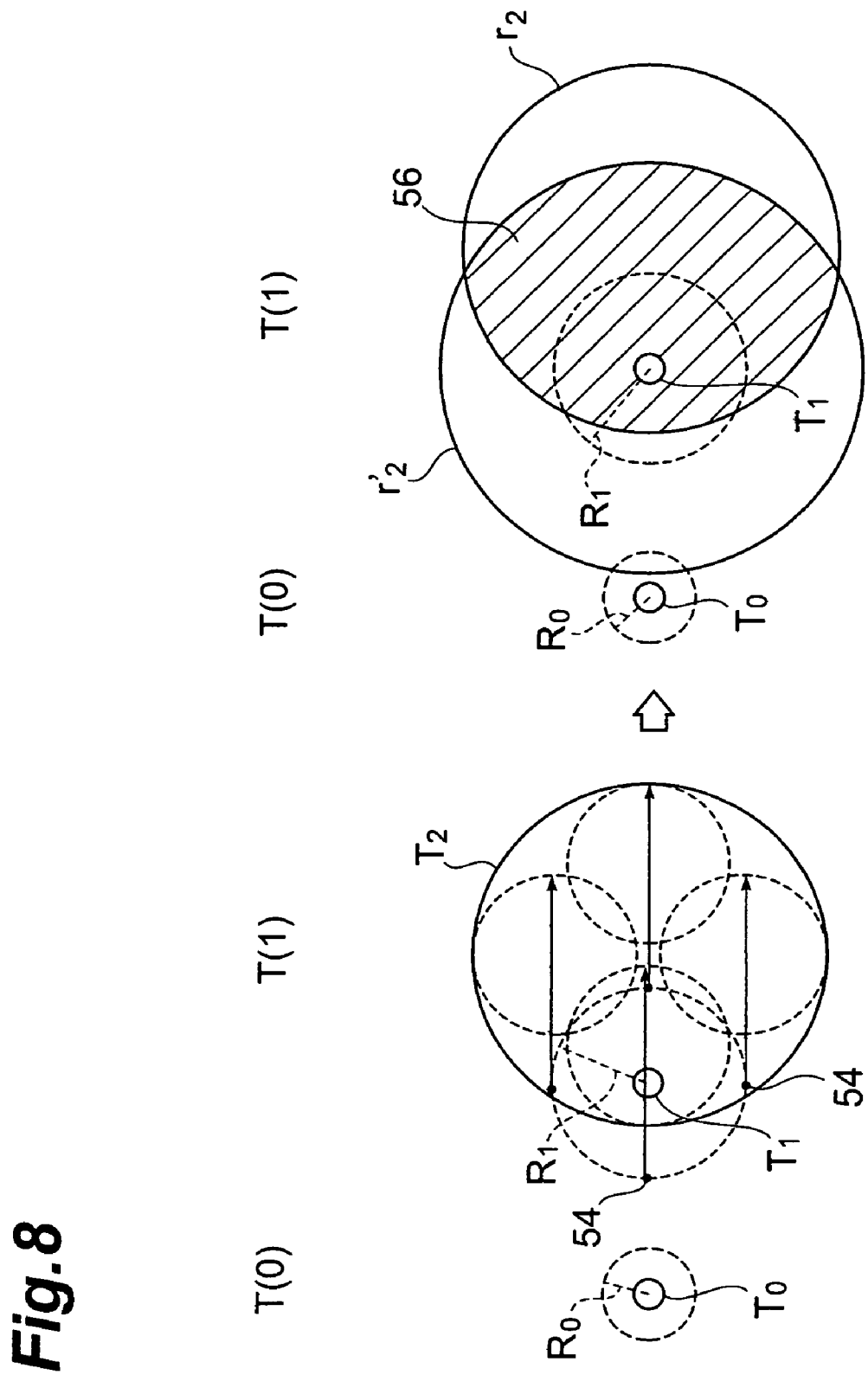
FIG. 8 is an illustration showing a method of estimating an existing area according to the first embodiment of the present invention.

Since the existing area is estimated from the start points 54 and moving areas r, the range of the existing area $r_2$ becomes large if the measurement error $R_1$ is so large that the accuracy of start points 54 is low. If the range of the existing area is large, as shown in FIG. 8, another existing area $r_2'$ is estimated using a point at another time, e.g., using the range of measurement error $R_0$ at time T(0) as start points, and an overlap 56 between the existing areas $r_2$, $r_2'$ is defined as the existing area at the time T(2), whereby the existing area can be estimated with higher accuracy.

Figure 9:
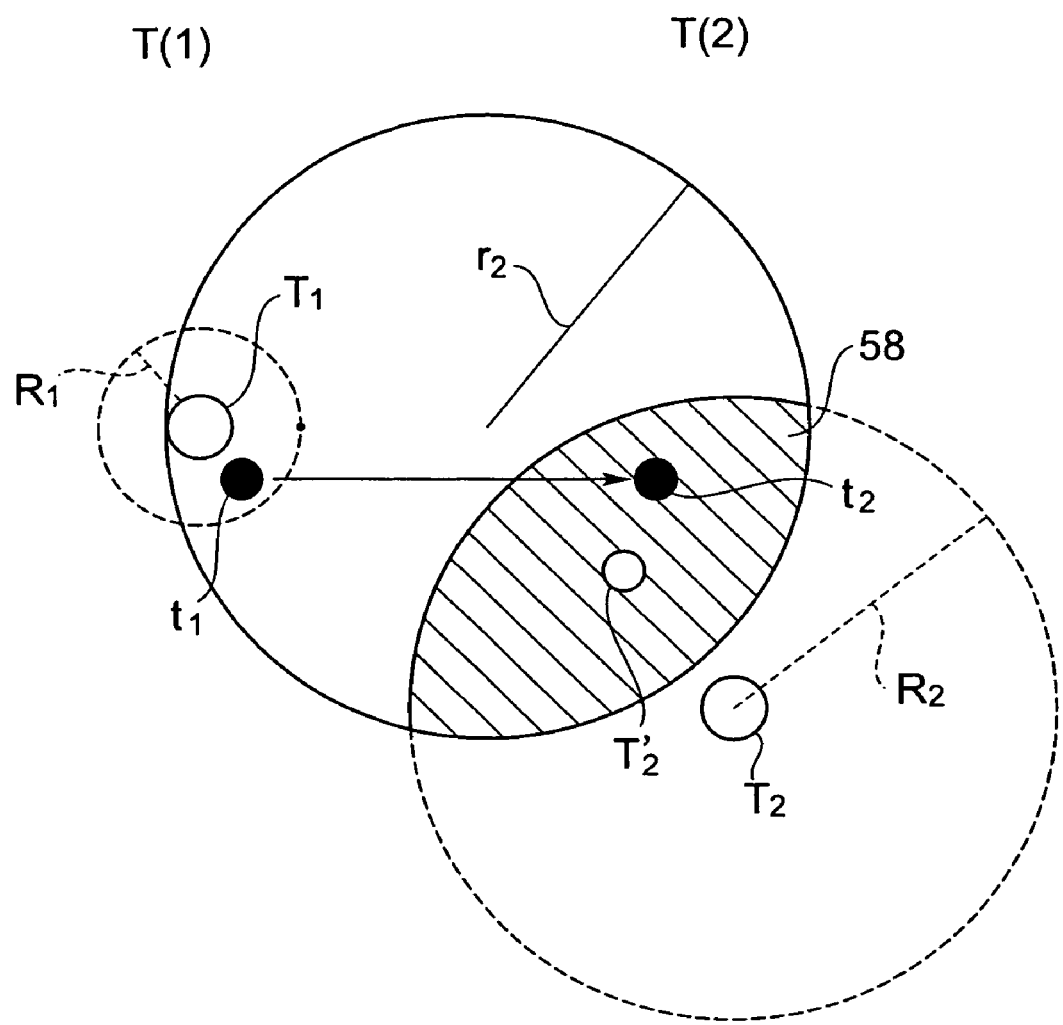
FIG. 9 is an illustration showing a method of estimating a location according to the first embodiment of the present invention.

Finally, the location at present of the mobile object is estimated from the existing area at present of the mobile object and from the location information and error information of the mobile object measured at the present time. FIG. 9 is an illustration showing a method of estimating the location according to the first embodiment of the present invention. As shown in FIG. 9, a center of gravity is calculated for an overlap 58 between the range of the existing area $r_2$ at the present time T(2) and the range of the measurement error $R_2$ at the measured location $T_2$, and the position of the center of gravity is defined as an estimate location $T_2'$, whereby the location can be estimated so as to match the actual location $t_2$ of the mobile object well.

Figure 10:
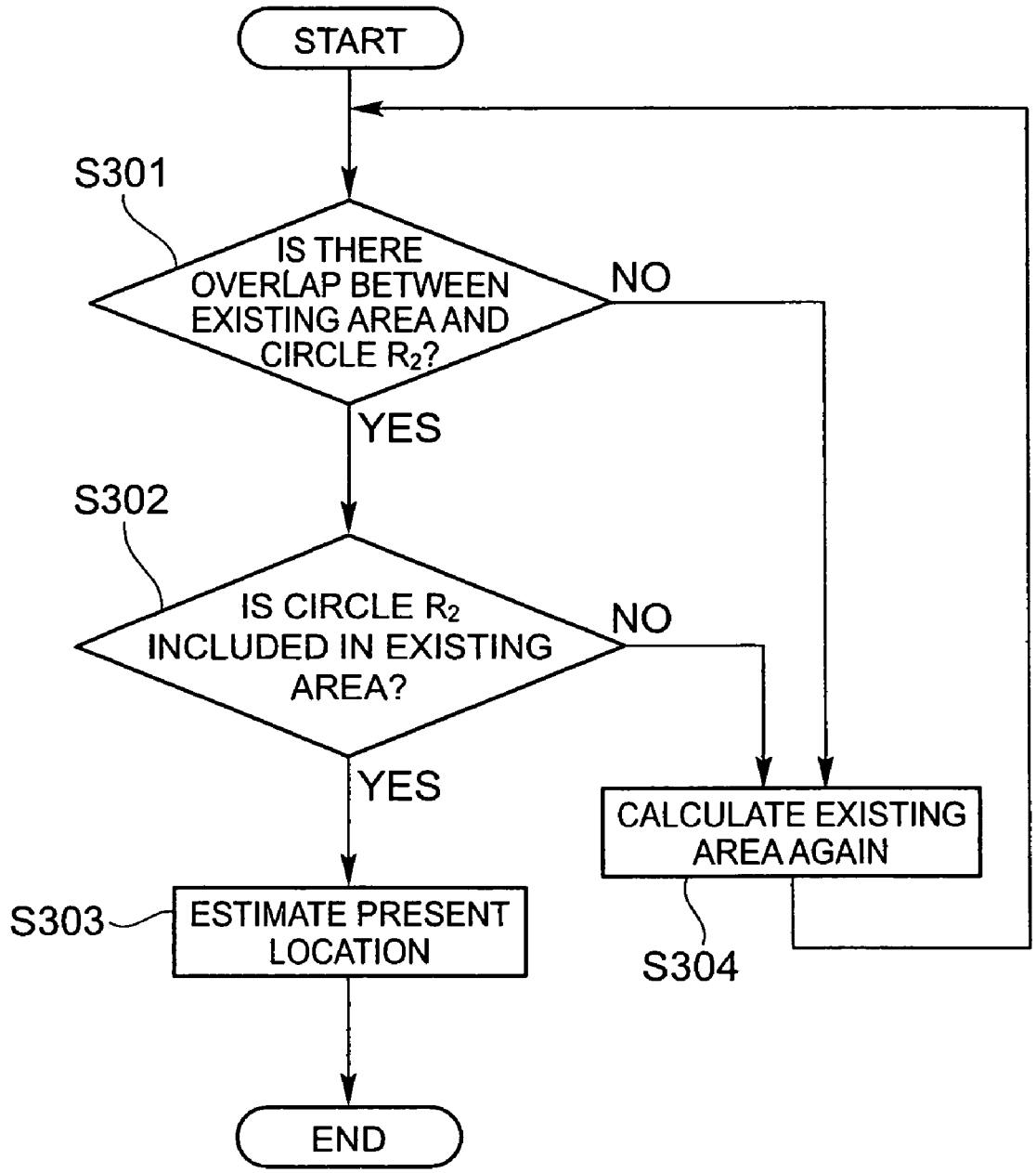
FIG. 10 is a flowchart showing estimation of a location according to the first embodiment of the present invention.
Figure 11:
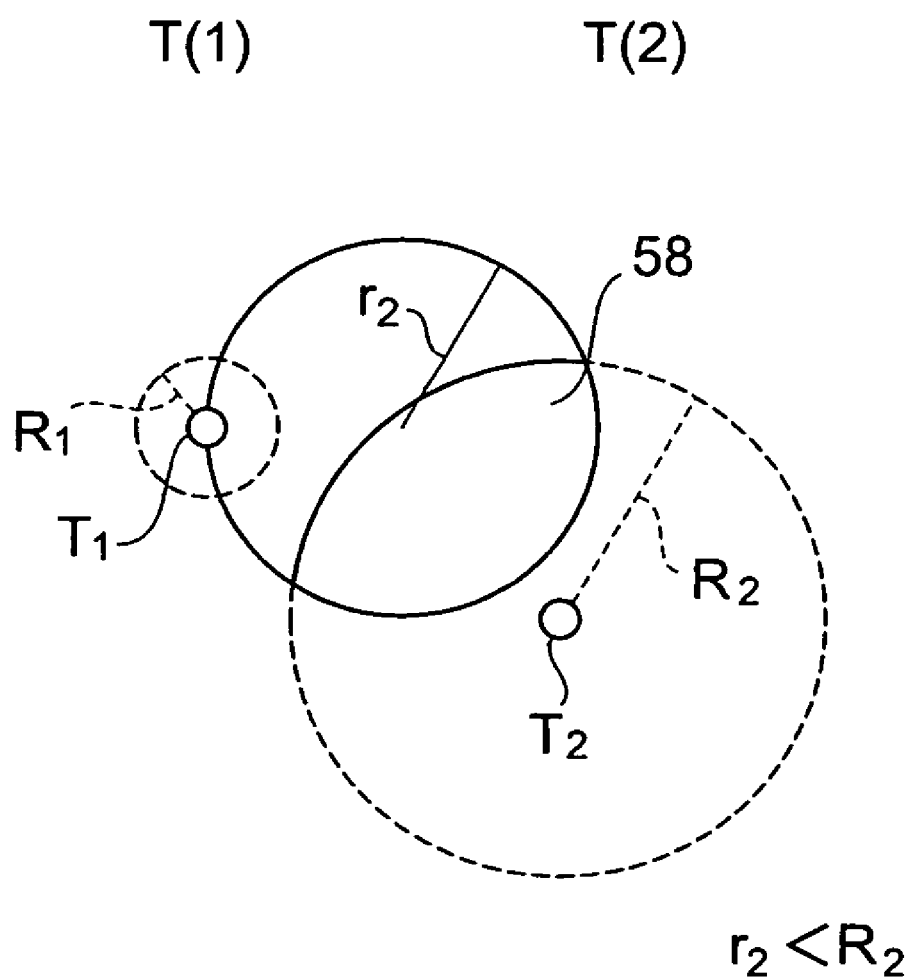
FIG. 11 is an illustration showing a relation among an existing area, measured locations, and measurement errors in the first embodiment of the present invention.
Figure 12:
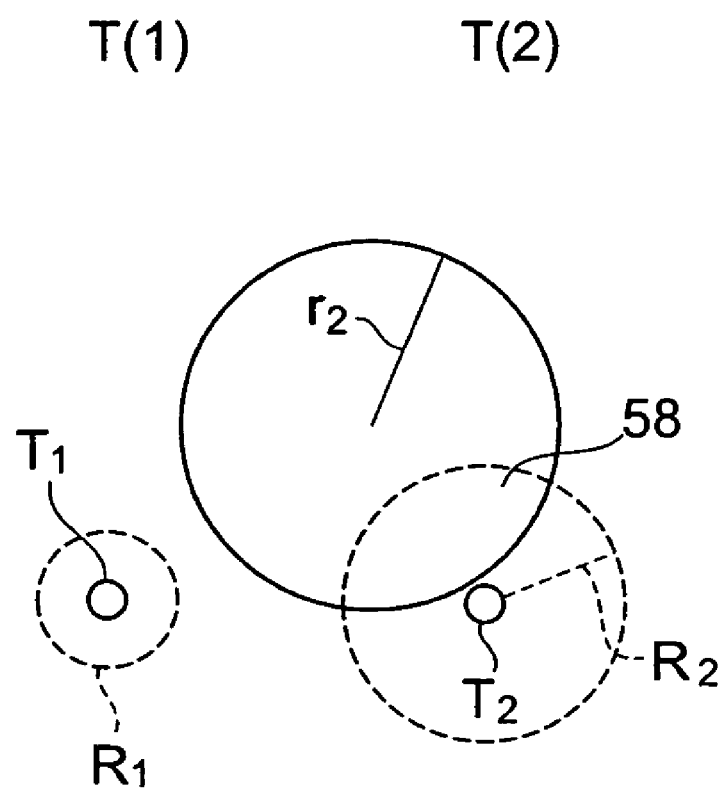
FIG. 12 is an illustration showing a relation among an existing area, measured locations, and measurement errors in the first embodiment of the present invention.
Figure 13:
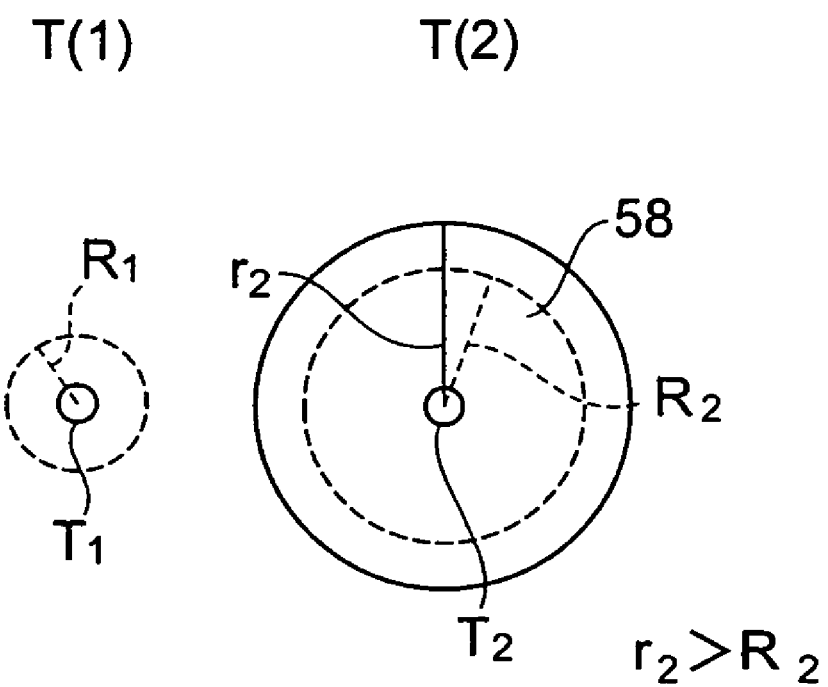
FIG. 13 is an illustration showing a relation among an existing area, measured locations, and measurement errors in the first embodiment of the present invention.
Figure 14:
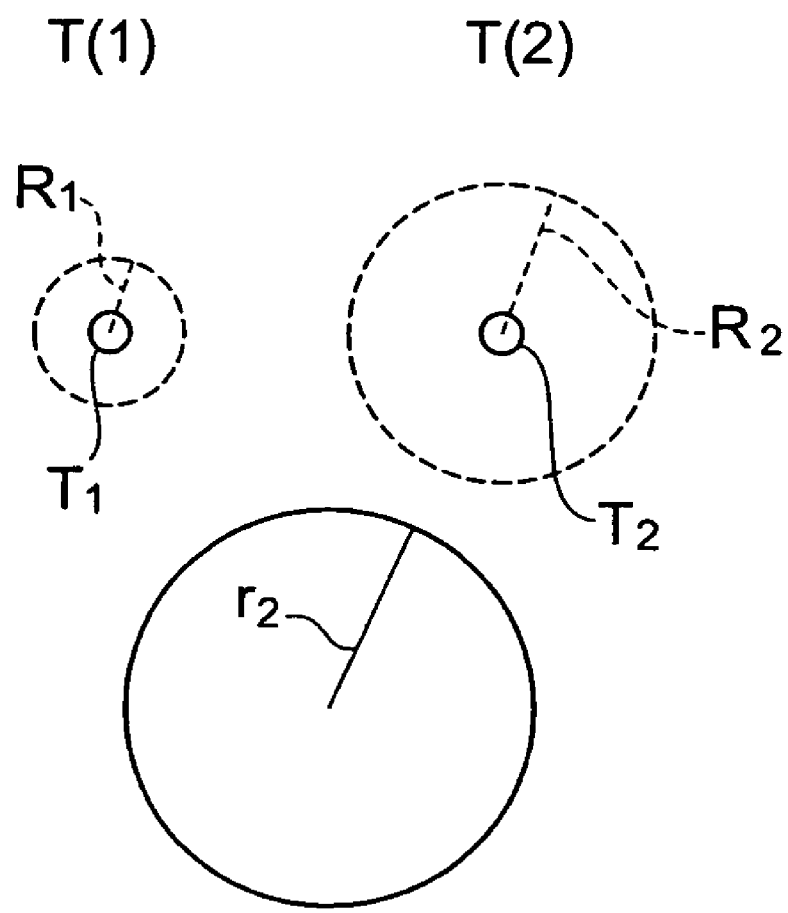
FIG. 14 is an illustration showing a relation among an existing area, measured locations, and measurement errors in the first embodiment of the present invention.

FIG. 10 is a flowchart showing the estimation of the location according to the first embodiment of the present invention, and FIGS. 11 to 14 are illustrations showing relations among an existing area, measured locations, and measurement errors according to the first embodiment of the present invention. As shown in FIG. 10, it is checked whether there is an overlap between the existing area $r_2$ and the circle of measurement error $R_2$ (S301). When there is an overlap 58 as shown in FIGS. 11 to 13, the flow goes to the next step; when there is no overlap as shown in FIG. 14, the accuracy of the existing area is insufficient, and the existing area is again estimated according to the technique as shown in FIG. 8 (S301, S304). Next, as shown in FIG. 10, it is checked whether the circle of measurement error $R_2$ is included in the existing area $r_2$ (S302). In either case of $r_2<R_2$ and $r_2>R_2$, the present location is estimated according to the technique shown in FIG. 9 as long as the circle of measurement error $R_2$ is not included in the existing area $r_2$ as shown in FIGS. 11 and 12 (S302, S303). If the circle of measurement error $R_2$ is included in the existing area $r_2$, as shown in FIG. 13, the accuracy of the existing area is not enough, and thus the existing area is again estimated according to the technique as shown in FIG. 8 (S302, S304).

The location estimating method of the present embodiment as described above permits the apparatus to perform the location estimation at a high matching rate with an actual state, without use of other device information, while effectively utilizing the information.

Next, the location estimating apparatus and location estimating method according to the second embodiment of the present invention will be described. The present embodiment is different from the above-described first embodiment in that the first step of estimating the moving area is to give a point value based on error information to the moving area estimated and to perform the estimation of the moving area from the location information and error information measured at a plurality of time points in the past before the point value becomes not less than a certain value.

Figure 15:
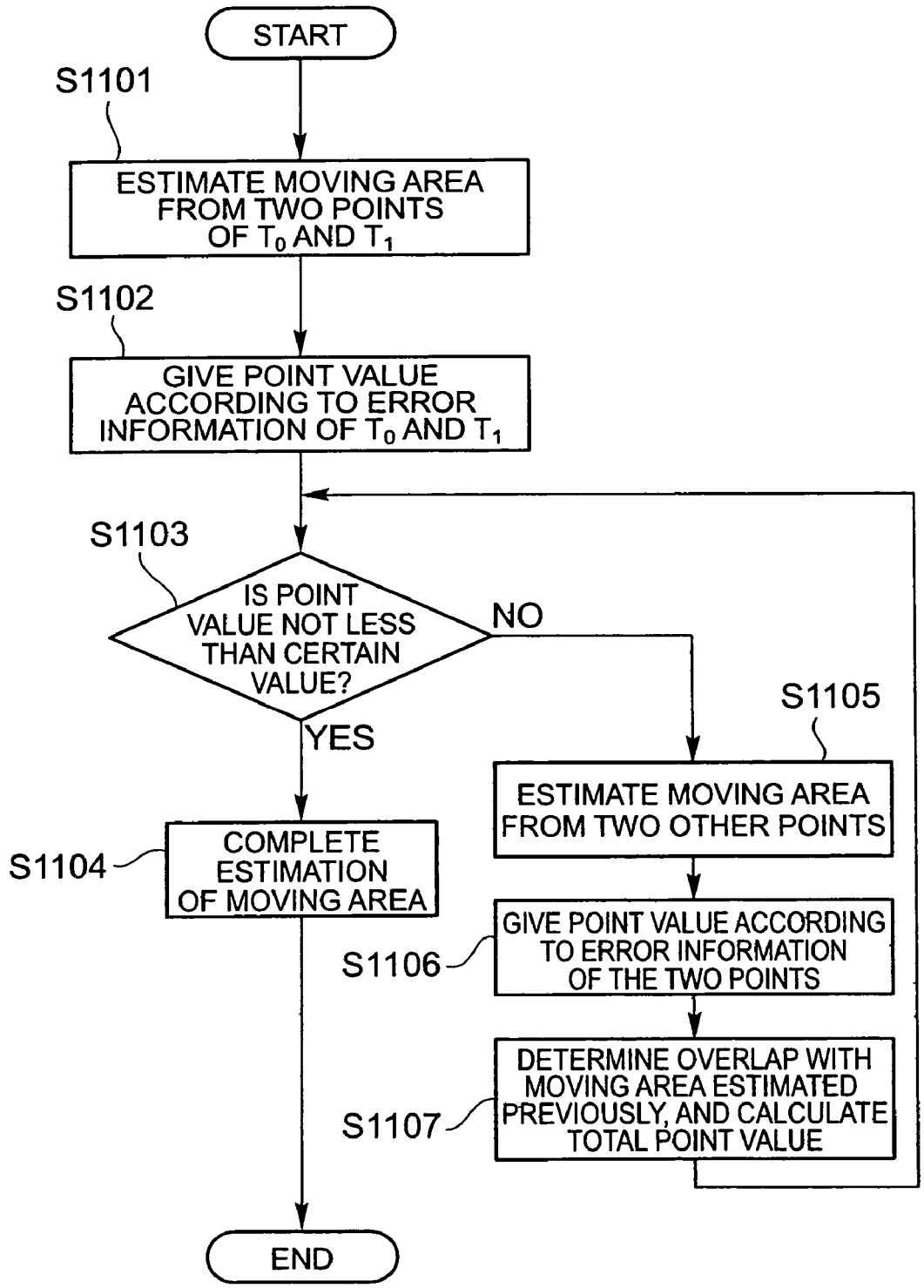
FIG. 15 is a flowchart showing estimation of a moving area according to the second embodiment of the present invention.
Figure 16:
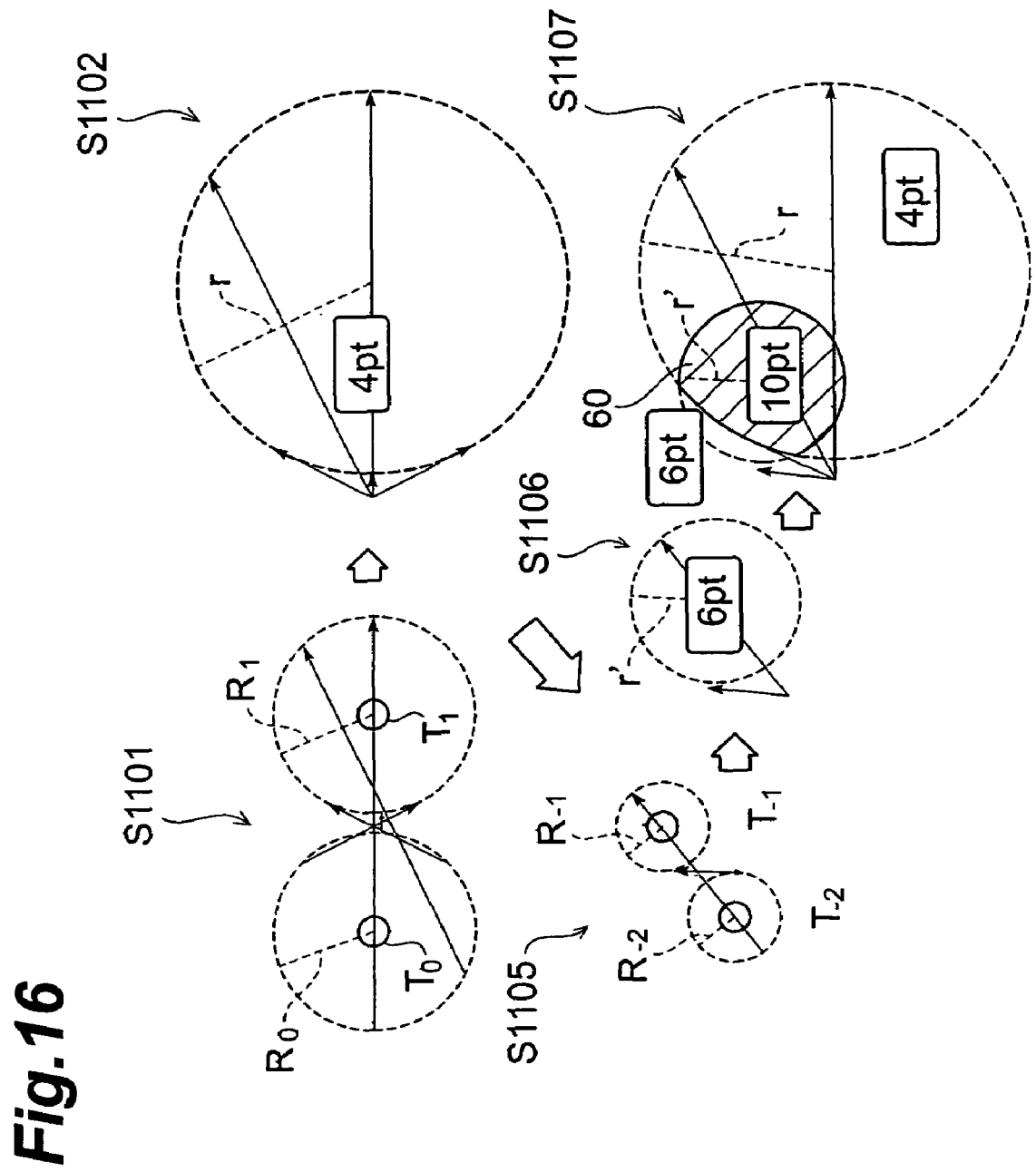
FIG. 16 is an illustration showing a method of estimating a moving area according to the second embodiment of the present invention.

FIG. 15 is a flowchart showing the estimation of the moving area according to the second embodiment of the present invention, and FIG. 16 an illustration showing the estimating method of the moving area according to the second embodiment of the present invention. First, the moving area is estimated from two points of measured locations $T_0$, $T_1$ (S1101). Next, a point value is given according to error information pieces $R_0$, $R_1$ of the measured locations $T_0$, $T_1$ (S1102). In the example of FIG. 16 four points are given.

When the point value is not less than a certain threshold, the estimation of the moving area is completed (S1103, S1104). When the point value is less than the certain threshold, the moving area is estimated from two other points (S1105). In the example of FIG. 16 the estimation of the moving area r' is carried out from two points of measured locations $T_{-1}$, $T_{-2}$. Then a point value is given according to error information pieces of the two points (S1106). In the example of FIG. 16, six points are given according to the error information pieces $R_1$, $R_2$ of the measured locations $T_{-1}$, $T_{-2}$. Then an overlap is obtained with the previously designated moving area and a total point value is calculated (S1107). In the example of FIG. 16, the overlap 60 between the moving areas r, r' is given 4+6=10 points. Thereafter, it is again checked whether the point value is not less than the certain value (S1103). When the point value is not less than the certain value, the overlap 60 is defined as the moving area and the estimation of the moving area is completed (S1104). When the point value is less than the certain value, the arithmetic processing part 20 repeats the steps of again performing the estimation of the moving area from two other points and checking whether the point value in the overlap with each moving area previously estimated is not less than the certain value (S1105-S1107).

Since the present embodiment is arranged to give points to an estimated moving area according to the error information, the moving area can be estimated with higher accuracy.

Figure 17:
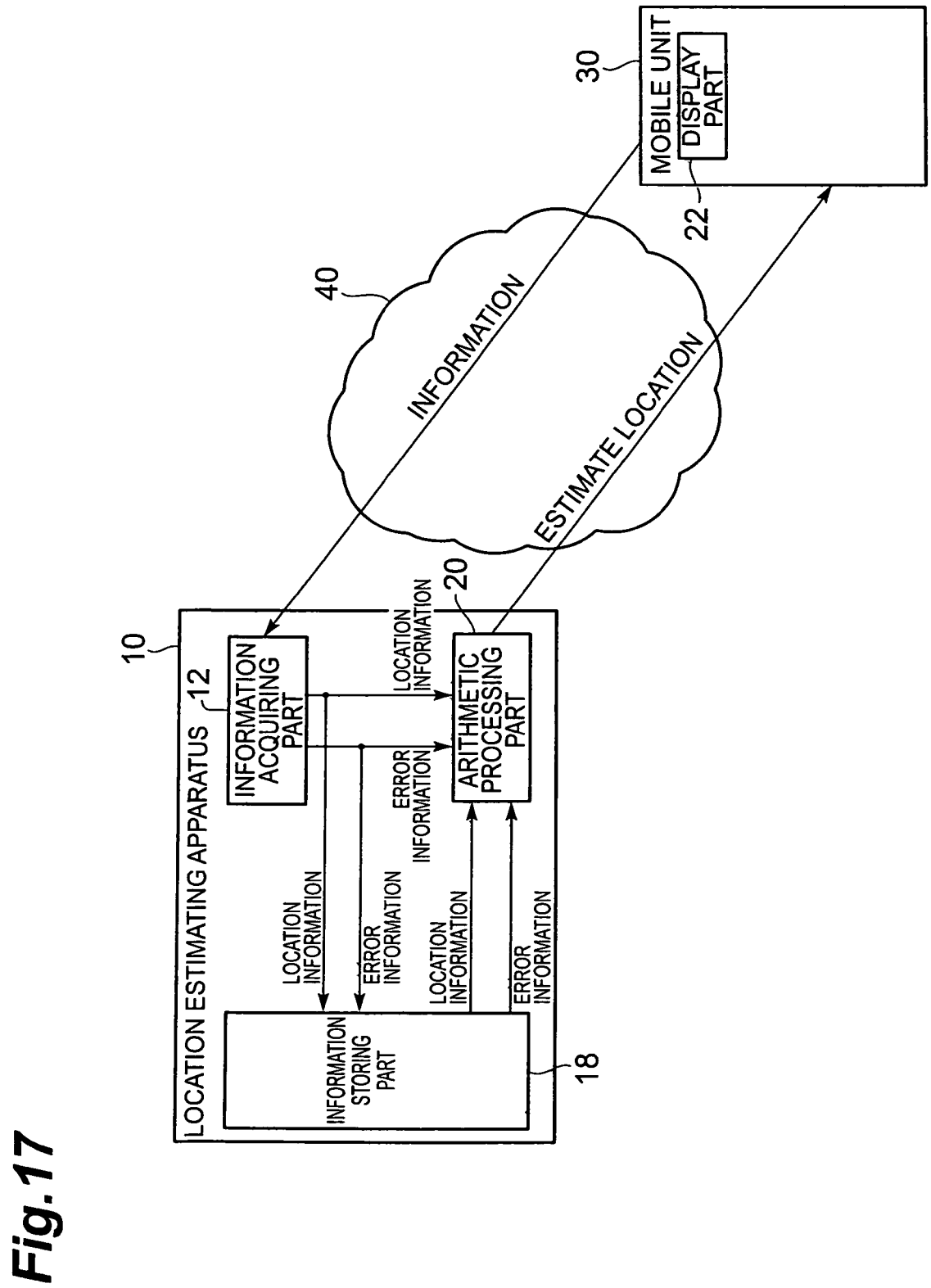
FIG. 17 is a diagram showing a location estimating apparatus according to the third embodiment of the present invention.

Next, the location estimating apparatus according to the third embodiment of the present invention will be described. FIG. 17 is a diagram showing the location estimating apparatus according to the third embodiment of the present invention. The present embodiment is different from the above-described first and second embodiments in that the location estimating apparatus 10 is not mounted on a mobile unit 30 carried by a user, but mounted on the network 40 side.

In the present embodiment, as shown in FIG. 17, the location estimating apparatus 10 is mounted on a server or the like to provide services, and is connected through network 40 to mobile unit 30 carried by the user. The location estimating apparatus 10, as in the case of the aforementioned first and second embodiments, has information acquiring part 12, information storing part 18, and arithmetic processing part 20. The location estimating apparatus 10 is configured to receive information from the mobile unit 30 and to transmit an estimated location through the network 40. The mobile unit 30 is provided with display part 22 for displaying the estimated location received from the location estimating apparatus 10.

When the information acquiring part 12 of the location estimating apparatus 10 acquires information through network 40 from the mobile unit 30, the arithmetic processing part 20 of the location estimating apparatus 10 calculates the estimated location from the location information and error information acquired from the information, as in the case of the aforementioned first and second embodiments. The estimated location thus calculated is transmitted through the network 40 to the mobile unit 30. The mobile unit 30, receiving the estimated location, displays the estimated location on the display part 22.

In the present embodiment, as described above, the location estimating apparatus is mounted on the network side, whereby the location estimating method of the present invention can be implemented by simply modifying the network side.

It is noted that the location estimating apparatus and location estimating method of the present invention are by no means limited to the above-described embodiments and can be obviously modified in various ways without departing from the spirit and scope of the present invention.

What is claimed is:

1. A location estimating apparatus comprising:
   information acquiring means for acquiring location information pieces and error information pieces of a mobile object measured at present and at a plurality of time points in the past; and
   arithmetic processing means for arithmetically processing the location information pieces and the error information pieces acquired by the information acquiring means, for estimating a moving area per unit time of the mobile object from the location information pieces and the error information pieces of the mobile object measured at a plurality of time points in the past, acquired by the information acquiring means, for estimating an existing area at present of the mobile object from the moving area per unit time of the mobile object and from the location information piece and the error information piece of the mobile object measured at a time point in the past, acquired by the information acquiring means, and for estimating a location at present of the mobile object from the existing area at present of the mobile object and from the location information piece and the error information piece of the mobile object measured at the present time, acquired by the information acquiring means.

2. The location estimating apparatus according to claim 1, wherein the arithmetic processing means estimates the moving area per unit time from the location information pieces and the error information pieces of the mobile object measured at a plurality of time points in the past, acquired by the information acquiring means, until an area of the moving area estimated per unit time is not more than a certain value.

3. The location estimating apparatus according to claim 1, wherein the arithmetic processing means provides a point value based on the error information pieces to the moving area estimated per unit time and estimating the moving area per unit time from the location information pieces and the error information pieces of the mobile object measured at a plurality of time points in the past, acquired by the information acquiring means, until the point value is not less than a certain value.

4. The location estimating apparatus according to any one of claims 1 to 3, wherein the arithmetic processing means estimates the existing area at present of the mobile object from the moving area per unit time of the mobile object and from the location information pieces and the error information pieces of the mobile object measured at a plurality of time points in the past, acquired by the information acquiring means.

5. A location estimating method comprising:
   a first step of estimating a moving area per unit time of a mobile object from location information pieces and error information pieces of the mobile object measured at a plurality of time points in the past;
   a second step of estimating an existing area at present of the mobile object from the moving area per unit time of the mobile object and from the location information piece and the error information piece of the mobile object measured at a time point in the past; and
   a third step of estimating a location at present of the mobile object from the existing area at present of the mobile object and from the location information piece and the error information piece of the mobile object measured at the present time.

6. The location estimating method according to claim 5, wherein the first step comprises estimating the moving area per unit time from the location information pieces and the error information pieces of the mobile object measured at the plurality of time points in the past, until an area of the moving area estimated per unit time is not more than a certain value.

7. The location estimating method according to claim 5, wherein the first step comprises giving a point value based on the error information pieces to the moving area estimated per unit time and estimating the moving area per unit time from the location information pieces and the error information pieces of the mobile object measured at the plurality of time points in the past, until the point value is not less than a certain value.

8. The location estimating method according to any one of claims 5 to 7, wherein the second step comprises estimating the existing area at present of the mobile object from the moving area per unit time of the mobile object and from the location information pieces and the error information pieces of the mobile object measured at a plurality of time points in the past.

9. A location estimating apparatus, comprising:
   a receiver configured to acquire location information pieces and error information pieces of a mobile object measured at present and at a plurality of time points in the past; and
   a processor configured to arithmetically process the location information pieces and the error information pieces acquired by the receiver, to estimate a moving area per unit time of the mobile object from the location information pieces and the error information pieces of the mobile object measured at the plurality of time points in the past, acquired by the receiver, to estimate an existing area at present of the mobile object from the moving area per unit time of the mobile object and from the location information piece and the error information piece of the mobile object measured at a time point in the past, acquired by the receiver, and to estimate a location at present of the mobile object from the existing area at present of the mobile object and from the location information piece and the error information piece of the mobile object measured at the present time, acquired by the receiver.

10. The location estimating apparatus according to claim 9, wherein the processor is configured to estimate the moving area per unit time from the location information pieces and the error information pieces of the mobile object measured at the plurality of time points in the past, acquired by the receiver, until an area of the moving area estimated per unit time is not more than a certain value.

11. The location estimating apparatus according to claim 9, wherein the processor is further configured to provide a point value based on the error information pieces to the moving area estimated per unit time and estimate the moving area per unit time from the location information pieces and the error information pieces of the mobile object measured at the plurality of time points in the past, acquired by the receiver, until the point value is not less than a certain value.

12. The location estimating apparatus according to any one of claims 9 to 11, wherein the processor is configured to estimate the existing area at present of the mobile object from the moving area per unit time of the mobile object and from the location information pieces and the error information pieces of the mobile object measured at the plurality of time points in the past, acquired by the receiver.

* * * * *